(12) United States Patent
Yang et al.

(10) Patent No.: US 7,592,394 B2
(45) Date of Patent: *Sep. 22, 2009

(54) PLASTIC COMPOSITIONS HAVING MINERAL-LIKE APPEARANCE

(75) Inventors: Shijun Yang, Maple Glen, PA (US); Paul Joseph Keating, Newportville, PA (US)

(73) Assignee: Arkema France, Colombes (FR)

( * ) Notice: Subject to any disclaimer, the term of this patent is extended or adjusted under 35 U.S.C. 154(b) by 335 days.

This patent is subject to a terminal disclaimer.

(21) Appl. No.: 11/005,921

(22) Filed: Dec. 7, 2004

(65) Prior Publication Data

US 2006/0122332 A1  Jun. 8, 2006

Related U.S. Application Data

(62) Division of application No. 09/445,844, filed on Dec. 15, 1999, now Pat. No. 6,841,612.

(51) Int. Cl.
| | |
|---|---|
| *C08L 33/02* | (2006.01) |
| *C08L 33/04* | (2006.01) |
| *C08L 33/20* | (2006.01) |
| *C08L 35/02* | (2006.01) |
| *C08L 9/02* | (2006.01) |
| *C08L 9/06* | (2006.01) |
| *C08L 23/00* | (2006.01) |
| *C08F 8/00* | (2006.01) |

(52) U.S. Cl. ............... 525/191; 525/221; 525/222; 525/232; 525/240; 525/241

(58) Field of Classification Search ............... 525/191, 525/221, 222, 232, 240, 241
See application file for complete search history.

(56) References Cited

U.S. PATENT DOCUMENTS

| 5,130,374 A | | 7/1992 | Cozens et al. | |
|---|---|---|---|---|
| 5,151,324 A | * | 9/1992 | Hanatani et al. | 428/327 |
| 5,242,968 A | | 9/1993 | Minghetti et al. | |
| 5,304,592 A | | 4/1994 | Ghahary | |
| 5,415,931 A | | 5/1995 | Minghetti et al. | |
| 5,625,001 A | * | 4/1997 | Makower et al. | 525/78 |
| 6,841,612 B1 | * | 1/2005 | Yang et al. | 524/523 |

FOREIGN PATENT DOCUMENTS

WO    WO 97/14749    4/1997

* cited by examiner

*Primary Examiner*—Nathan M Nutter
(74) *Attorney, Agent, or Firm*—Thomas F. Roland

(57) ABSTRACT

Composite plastic compositions based on the dispersion of selected crosslinked polymers in certain thermoplastic matrices are disclosed. The composite compositions are readily formed and processed by thermal extrusion processes versus conventional casting processes. Preferred composite plastic compositions based on crosslinked poly(alkyl (meth)acrylate) polymers and modified poly(alkyl (meth)acrylate) thermoplastics are especially useful in the preparation of synthetic architectural materials having a mineral-like appearance, such as that of granite.

8 Claims, No Drawings

PLASTIC COMPOSITIONS HAVING MINERAL-LIKE APPEARANCE

This application is a Divisional application of U.S. application Ser. No. 09/445,844, filed Dec. 15, 1999, now issued as U.S. Pat. No. 6,841,612.

BACKGROUND

This invention relates to composite plastic compositions useful in the preparation of simulated natural substances, such as stone-like and mineral-like materials. In particular the present invention involves the use of specific crosslinked polymers together with certain thermoplastic matrices to provide composite plastic compositions having a mineral-like appearance, especially an appearance similar to that of granite.

There currently exists a need for synthetic materials that mimic the appearance of mineral-like or ceramic-like materials, such as natural stone, and in particular granite, for use in the manufacture of flooring, tiles, counter tops, sinks, spas, sanitaryware, architectural articles and other ornamental materials. For example, acrylic "granite" sheet products useful in spas, sanitaryware and outdoor applications are currently prepared by cell or continuous casting processes where small granulates are suspended in monomer or monomer/polymer mixtures and then "cured," such as is described in U.S. Pat. No. 5,304,592 and WO 97/14749. These thermoset materials can not be further fabricated by conventional thermoplastic processing methods (such as sheet extrusion and injection molding operations); furthermore, the thermoset processes currently require special handling steps or raw material limitations to uniformly suspend the granulates in the polymerizing matrix during the "cure" step. Reuse and recycling of waste and off-grade materials, such as trimmings, from prior art sheet materials is impractical due to the inherent intractability of the thermoset materials. Prior art "granite" sheet products prepared by casting methods generally have poor impact strength, for example brittleness, and are limited in their adaptability to various formulation or processing methods for producing final articles. In addition, the prior art materials often provide poor adhesion to substrate surfaces resulting in subsequent "delamination" of composite articles.

It is, therefore, desirable to be able to provide thermoplastic materials that may be fabricated by conventional thermoplastic equipment (such as extrusion or injection molding) for use in spas and outdoor architectural applications; there is a need for an economical and efficient method for reuse and recyling of waste materials that is not available with current thermoset casting processes.

The problem addressed by the present invention is to overcome the deficiencies of prior methods used to prepare mineral-like plastics by providing materials that are processable by less labor intensive methods, such as coextrusion or extrusion, while also improving the economics of the processing by allowing for reuse and recycling of waste materials.

STATEMENT OF INVENTION

The present invention provides a composite plastic composition comprising a particulate crosslinked polymer dispersed within a thermoplastic matrix, wherein (a) the composite plastic composition is comprised of 10 to 45 weight percent of the crosslinked polymer, based on weight of the composite plastic composition, and the crosslinked polymer has a particle size substantially from 0.2 to 1.2 millimeters; (b) the crosslinked polymer is comprised of 0.1 to 15 weight percent inert filler and 0.1 to 20 weight percent crosslinker, based on total weight of crosslinked polymer; and (c) the crosslinked polymer is visually differentiable from the thermoplastic matrix.

The present invention further provides a process for preparing a composite plastic composition comprising (a) preparing a crosslinked polymer comprising 0.1 to 15 weight percent inert filler and 0.1 to 20 weight percent crosslinker, based on weight of crosslinked polymer; (b) comminuting the crosslinked polymer to particles having a particle size substantially from 0.2 to 1.2 millimeters; (c) dispersing 10 to 45 weight percent of the particles of crosslinked polymer within 55 to 90 weight percent of a thermoplastic matrix by a heat processing treatment; and (d) recovering the composite plastic composition as a particulate material.

In another aspect, the present invention provides a composite plastic composition comprising a particulate crosslinked polymer dispersed within a thermoplastic matrix, wherein (a) the composite plastic composition is comprised of greater than 20 to 40 weight percent of the crosslinked polymer, based on weight of the composite plastic composition, and the particle size of the crosslinked polymer is substantially from 0.3 to 1.2 millimeters; (b) the crosslinked polymer is comprised of (i) from 95 to 99.5 weight percent (meth)acrylic monomer units selected from one or more of methyl methacrylate, ethyl acrylate and acrylic acid; (ii) from 0.5 to 5 weight percent crosslinker units selected from one or more of allyl methacrylate, ethylene glycol dimethacrylate and divinylbenzene; and (iii) from 0.3 to 5 weight percent inert filler selected from one or more of titanium dioxide, iron oxide, alumina, carbon black, pigments and silica, based on total weight of crosslinked polymer; (c) the thermoplastic matrix is comprised of (i) 50 to 60 weight percent poly(alkyl (meth)acrylate) comprising a copolymer of 80 to 99 weight percent methyl methacrylate monomer units and 1 to 20 weight percent ($C_1$-$C_{10}$)alkyl acrylate monomer units, based on weight of poly(alkyl (meth)acrylate); and (ii) 40 to 50 weight percent impact modifier comprising a multi-stage sequentially produced polymer, based on weight of thermoplastic matrix; and (d) the crosslinked polymer is visually differentiable from the thermoplastic matrix.

In other embodiments, the present invention provides a plastic composite composition prepared according to the process described above and an article of manufacture comprising an extruded sheet material resulting from extrusion of the composite plastic composition described above.

DETAILED DESCRIPTION

The process of the present invention is useful for preparing a range of composite plastic compositions suitable for use in forming simulated mineral-like articles. Common to each of the composite compositions is the dispersion of a particulate crosslinked polymer within a thermoplastic matrix. We have found that composite plastic compositions based on selected crosslinked polymers, having selected crosslinking levels and a selected particle size range, result in unexpectedly improved extrusion process performance and the ability to provide "granite-like" plastic articles as compared with prior art plastics using cell-casting processes.

As used herein, the term "thermoplastic" refers to polymers that are reversibly deformable (able to be softened) after being heated above their softening or glass transition temperatures and then cooled; these materials are capable of being repeatedly melt processed in plastic manufacturing machinery such as, for example, injection molding, extrusion, blow molding, compression molding and rotational molding. As is generally accepted by those skilled in the art, thermoplastic polymers include, for example, acrylonitrile/butadiene/styrene (ABS) terpolymer, acrylonitrile/styrene/acrylate (ASA) copolymer, polycarbonate, polyester, methyl methacrylate/butadiene/styrene (MBS) copolymer, high impact polystyrene (HIPS), acrylonitrile/acrylate copolymer, acrylonitrile/methyl methacrylate copolymer, impact modified polyolefins, impact modified polyvinyl chloride (PVC) and impact modified polymethacrylates.

As used herein, the term "thermoset" refers to polymers that are irreversibly deformable after they have been prepared in an initial configuration, that is, once the polymer is formed by chemical crosslinking (usually thermally induced) it is no longer amenable to thermal processing into other physical forms. As is generally accepted by those skilled in the art, thermoset polymers are polymers that include crosslinking as part of their preparation or have been subjected to crosslinking reactions as part of a post-treatment step, for example, allyl ester polymers, epoxy resins, crosslinked acrylic polymers and crosslinked styrenic polymers produced by suspension, emulsion, continuous-cast or cell-cast polymerization methods.

As used herein, the term "thermoforming" refers to the processing of polymers into 3-dimensional molded forms from flat plastic preformed materials, such as film or sheet, under the influence of heat, pressure or vacuum or combinations thereof.

As used herein, the term "particulate material" refers to any material in the form of separate particles or divided fragments, such as, for example, pellets, beads, powders, granules and chips.

As used herein, the term "alkyl (meth)acrylate" refers to either the corresponding acrylate or methacrylate ester; similarly, the term "(meth)acrylic" refers to either acrylic or methacrylic acid and the corresponding derivatives, such as esters or amides. As used herein, all percentages referred to will be expressed in weight percent (%), based on total weight of polymer or composition involved, unless specified otherwise. As used herein, the term "copolymer" or "copolymer material" refers to polymer compositions containing units of two or more monomers or monomer types. As used herein, "extrusion blended" and "extrusion compounded" are used synonymously and refer to the intimate mixing of two materials by melt extrusion.

The composite plastic compositions of the present invention use selected crosslinked polymers in combination with selected thermoplastic materials, the latter providing a thermoplastic matrix. Crosslinked polymers useful in the present invention include, for example, crosslinked vinyl polymers (prepared from monoethylenically unsaturated monomers and various multifunctional crosslinking monomers) and crosslinked condensation polymers (such as polyepoxy resins and polyesters, for example, poly(butylene terephthalate) and poly(ethylene terephthalate)). Thermoset polymers represent one class of crosslinked polymers useful in the present invention.

Suitable monoethylenically unsaturated monomers useful in preparing particulate crosslinked polymers of the present invention include vinylaromatic monomers, ethylene and substituted ethylene monomers.

Suitable vinylaromatic monomers include, for example, styrene and substituted styrenes, such as α-methylstyrene, vinyltoluene, ortho-, meta- and para-methylstyrene, ethylvinylbenzene, vinylnaphthalene and vinylxylenes. The vinylaromatic monomers can also include their substituted counterparts, for example, halogenated derivatives, that is, containing one or more halogen groups (such as fluorine, chlorine and bromine).

Another class of suitable monoethylenically unsaturated monomers is ethylene and substituted ethylene monomers, for example: α-olefins such as propylene, isobutylene and long chain alkyl α-olefins (such as ($C_{10}$-$C_{20}$)alkyl α-olefins); vinyl alcohol esters such as vinyl acetate and vinyl stearate; vinyl halides such as vinyl chloride, vinyl fluoride, vinyl bromide, vinylidene chloride, vinylidene fluoride and vinylidene bromide; vinyl nitriles such as acrylonitrile and methacrylonitrile; acrylic acid and methacrylic acid and derivatives such as corresponding amides and esters; maleic acid and derivatives such as corresponding anhydride, amides and esters; fumaric acid and derivatives such as corresponding amides and esters; itaconic and citraconic acids and derivatives such as corresponding anhydrides, amides and esters.

A preferred class of monomers useful in preparing the crosslinked polymers of the present invention are (meth)acrylic monomers, particularly ($C_1$-$C_{22}$)alkyl (meth)acrylate monomers. Examples of the alkyl (meth)acrylate monomer where the alkyl group contains from 1 to 6 carbon atoms are methyl methacrylate (MMA), methyl acrylate and ethyl acrylate (EA), propyl methacrylate, butyl methacrylate (BMA), butyl acrylate (BA), isobutyl methacrylate (IBMA), hexyl and cyclohexyl methacrylate, cyclohexyl acrylate and combinations thereof.

Examples of alkyl (meth)acrylate monomers where the alkyl group contains from 7 to 22 carbon atoms are 2-ethylhexyl acrylate (EHA), 2-ethylhexyl methacrylate, octyl methacrylate, decyl methacrylate, isodecyl methacrylate (IDMA, based on branched ($C_{10}$)alkyl isomer mixture), undecyl methacrylate, dodecyl methacrylate (also known as lauryl methacrylate), tridecyl methacrylate, tetradecyl methacrylate (also known as myristyl methacrylate), pentadecyl methacrylate and combinations thereof. Also useful are: dodecyl-pentadecyl methacrylate (DPMA), a mixture of linear and branched isomers of dodecyl, tridecyl, tetradecyl and pentadecyl methacrylates; and lauryl-myristyl methacrylate (LMA), a mixture of dodecyl and tetradecyl methacrylates.

Additional ($C_7$-$C_{22}$)alkyl (meth)acrylate monomers include hexadecyl methacrylate (also known as cetyl methacrylate), heptadecyl methacrylate, octadecyl methacrylate (also known as stearyl methacrylate), nonadecyl methacrylate, eicosyl methacrylate, behenyl methacrylate and combinations thereof, also useful are cetyl-eicosyl methacrylate (CEMA), a mixture of hexadecyl, octadecyl, and eicosyl methacrylate; and cetyl-stearyl methacrylate (SMA), a mixture of hexadecyl and octadecyl methacrylate.

Suitable crosslinking monomers include, for example, ethylene glycol dimethacrylate, polyethylene glycol diacrylate and dimethacrylate, propylene glycol dimethacrylate and diacrylate, glycidyl methacrylate, divinylbenzene, triallyl isocyanurate, N-(hydroxymethyl)acrylamide, allyl acrylate, allyl methacrylate, N,N'-methylene diacrylamide and dimethacrylamide, triallyl citrate, trimethylolpropane triacrylate, trimethylolpropane trimethacrylate, and diethyleneglycol divinyl ether. Preferred crosslinkers are allyl methacrylate, ethylene glycol dimethacrylate and divinylbenzene. The amount of crosslinking monomer is generally from 0.1 to 20%, typically from 0.5 to 10%, preferably from 0.5 to 5%, more preferably from 1 to 4% and most preferably from greater than 1.5% to 3%, based on total weight of the crosslinked polymer, that is, combined weight of monoethylenically unsaturated monomer and the crosslinking monomer.

Suitable free-radical initiators useful in the present invention are any of the well known free-radical-producing compounds such as peroxy and hydroperoxy initiators, including, for example, acetyl peroxide, benzoyl peroxide, lauroyl peroxide, caproyl peroxide, cumene hydroperoxide, 1,1-di(tert-butylperoxy)-3,3,5-trimethylcyclohexane, tert-butyl peroxyisobutyrate, tert-butyl peracetate, tert-butyl peroxypivalate (TBPV) and tert-butyl peroctoate (TBP, also known as tert-butylperoxy-2-ethylhexanoate). Also useful, for example, are azo initiators such as azodiisobutyronitrile (AIBN), azodiisobutyramide, 2,2'-azo-bis(2,4-dimethylvaleronitrile), azo-bis($\alpha$-methylbutyronitrile) and dimethyl-, diethyl- or dibutyl azo-bis(methylvalerate). The initiator concentration is typically between 0.01 and 5%, preferably from 0.05 to 2% and more preferably from 0.1 to 1%, by weight based on the total weight of the monomers. In addition to the initiator, one or more promoters may also be used; preferably the promoters are hydrocarbon-soluble. Alternatively, little or no free-radical initiator may be used and the polymerization is then thermally induced by heating the monomer mixture.

The crosslinked polymer also contains inert filler that may be conveniently added to a cell casting syrup before starting the polymerization. Suitable inert fillers, include, for example, alumina (including hydrated forms), titanium dioxide, zinc oxide, zinc sulfide, iron oxide, barium sulfate, zirconium silicate, strontium sulfate, calcium carbonate, carbon black, powdered glass, silica, clay and talc. Preferred inert fillers include titanium dioxide, iron oxide, carbon black, silica, alumina, pigments and combinations thereof; most preferred is titanium dioxide. Conventional pigments or colorants include organic dyes (for example azo, anthraquinone, perinone, quinoline, pyrazolone, dioxazine, isoindoline, phthalocyanine, quinacridone and coumarin derivatives) and inorganic salts (cadmium, chromates, iron blue, cobalt blue and ultramarine blue). Typically, the amount of inert filler is from 0.1 to 15%, preferably from 0.2 to 10% and more preferably from 0.3 to 5%, based on total weight of crosslinked polymer. The purpose of the inert filler is to enhance the visual differentiation between the crosslinked polymer component and the thermoplastic matrix component to provide the "mineral-like" or "granite-like" appearance of the finished composite plastic composition.

Optionally, the crosslinked polymer may contain conventional adjuvants, known to those skilled in the art, for various purposes, for example: dyes, pigments, antioxidants, ultraviolet stabilizers, dispersants, processing aids (such as spray drying aids, lubricants and mold-release agents), flame retardants, polymerization rate-moderators and viscosity controlling materials. In addition, these same conventional adjuvants may be conveniently added at later stages in the production of the composite plastic composition, for example, during preparation of the thermoplastic material used as the thermoplastic matrix (described below) or during the production of the composite plastic composition itself where the crosslinked polymer and thermoplastic material are extrusion blended or compounded.

Typically, the particulate crosslinked polymers of the present invention are selected from the group consisting of crosslinked poly(alkyl (meth)acrylate), crosslinked poly(vinylaromatic), crosslinked polyester, crosslinked polyolefin, mixtures and corresponding copolymers thereof. Preferred crosslinked polymers are crosslinked poly(alkyl (meth)acrylates) and crosslinked polystyrene where the crosslinked polymer comprises 90 to 99.5% monomer units selected from one or more of vinylaromatic monomer and (meth)acrylic monomer and 0.5 to 10% crosslinker, based on weight of crosslinked polymer.

The crosslinked polymer material is conveniently prepared by a cell casting process, for example. In a typical cell casting process a monomer syrup containing the monoethylenically unsaturated monomers, a crosslinking agent and a free-radical initiator is subjected to a temperature suitable for polymerization, depending on the monomers and initiators used. Preferred monoethylenically unsaturated monomers are alkyl (meth)acrylate monomers, for example, ($C_1$-$C_4$)alkyl (meth)acrylates, such as MMA (typically 80 to 99.5% and preferably from 95 to 99.5%, based on total weight of monomers), methylacrylate or EA (typically from zero to 20%, preferably from 1 to 8% and more preferably from 0.5 to 5%, based on total weight of monomers), propyl methacrylate, BMA, BA, IBMA and combinations thereof. Optionally, acrylic or methacrylic acid may be included, typically from zero 2%, based on total weight of monomers.

After the crosslinked polymer is prepared, such as by cell cast polymerization, it is comminuted to a particulate material by known processes, for example, chipping, crushing, grinding, shredding or any granulation method; if suspension or emulsion polymerization processes are used to prepare the crosslinked polymer, conventional isolation processes used to recover the crosslinked polymer in particulate form include, for example filtration, coagulation and spray drying. The dimensions of the particulate crosslinked polymer are typically from 0.2 to about 1.2 millimeters (mm) or about 16 to 70 U.S. standard mesh. Generally, the particle size of the particulate crosslinked polymer is substantially from 0.25 to 1.2 mm (16 to 60 mesh), preferably from 0.3 to 1.2 mm (16 to 50 mesh), more preferably from 0.4 to 1.0 mm (18 to 40 mesh) and most preferably from 0.4 to 0.85 mm (20 to 40 mesh). When the particle size of the crosslinked polymer is smaller than about 70 mesh or larger than about 16 mesh, the extrusion blending of the crosslinked polymer into the thermoplastic matrix becomes problematic, for example "stranding" problems, and the desired "speckle-like" or "mineral-like" effect may not be readily attained in the final decorative or architectural article.

Thermoplastic materials useful to provide the thermoplastic matrix of the present invention include, for example, alkyl (meth)acrylate polymers and copolymers having little or no crosslinker. The thermoplastic materials are conveniently prepared by conventional cell casting or melt extrusion processes and are typically provided in particulate form. In addition, the thermoplastic materials may be prepared by conventional bulk (for example, continuous flow stirred tank reactor (CFSTR) processes), solution, suspension or emulsion polymerization techniques, in which case conventional isolation processes used to recover the polymer in particulate form include, for example filtration, coagulation and spray drying. Conditions for polymerization of monomers to produce the thermoplastic material are similar to those described above for cell casting polymerization, except that little or no crosslinker is involved; when melt extrusion methods are used, the thermoplastic material is conveniently isolated in a particulate form, such as pellets or granules. Suitable alkyl (meth)acrylate monomers include, for example, the ($C_1$-$C_{22}$) alkyl (meth)acrylates monomers described above for the use in preparing the crosslinked polymers. Preferably the thermoplastic matrix material comprises a polymer or copolymer of methyl methacrylate (MMA); typical copolymers include 80 to 99% MMA and 1 to 20%, preferaby 1 to 5%, of ($C_1$-$C_{10}$) alkyl acrylates, such as methyl acrylate and ethyl acrylate (EA). A suitable commercially available poly(methyl methacrylate) type thermoplastic matrix material is Plexiglas V-grade molding powder, such as Plexiglas VO-825, VO-825HID, VO-45, VO-52 and VO-920.

Additional suitable thermoplastic polymers include, for example, ABS terpolymer, ASA copolymer, polycarbonate, polyester (such as poly(butylene terephthalate) and poly(ethylene terephthalate)), MBS copolymer, HIPS, acrylonitrile/acrylate copolymer, acrylonitrile/methyl methacrylate copolymer, impact modified polyolefins and impact modified PVC. More preferably the thermoplastic matrix material is an impact modified polymethacrylate.

The thermoplastic matrix may be based entirely on the aforementioned thermoplastic polymers or the thermoplastic matrix may optionally contain modifier additives, such as impact modifiers, in addition to the aforementioned thermoplastic polymers. In general, the thermoplastic matrix comprises 50 to 100% poly(alkyl (meth)acrylate) and zero to 50% impact modifier, based on weight of thermoplastic matrix. Typically, the thermoplastic matrix contains 25 to 100%, preferably 30 to 70%, more preferably 45 to 60% and most preferably 50 to 60%, thermoplastic polymer, such as poly(alkyl (meth)acrylate); and zero to 75%, preferably 30 to 70%, more preferably 40 to 55% and most preferably 40 to 50%, impact modifier, based on total weight of thermoplastic matrix. Suitable impact modifiers include, for example, elastomeric polymers such as graft polymers of methyl methacrylate and styrene on butadiene (MBS), graft polymers of acrylonitrile and styrene on butadiene (ABS), copolymers of styrene and butadiene, poly(butyl acrylate) and poly(2-ethylhexyl acrylate) and copolymers thereof, copolymers of butyl acrylate and methyl acrylate, terpolymers of butyl acrylate/styrene/methyl methacrylate, chlorinated polyethylene, acrylate block polymers, styrene block polymers, ethylene/propylene/diene copolymer (EPDM), ethylene/vinyl acetate copolymers, acrylonitrile/styrene/acrylic ester terpolymers, styrene-maleic anhydride copolymers and core-shell multi-stage sequentially-produced polymers. Preferred impact modifiers include MBS polymers, core-shell multi-stage sequentially-produced polymers, and styrene and acrylate block polymers.

Typical core-shell multi-stage polymers useful as impact modifiers for thermoplastic polymers include, for example, those disclosed in U.S. Pat. No. 3,793,402. The multi-stage sequentially-produced polymers are characterized by having at least three stages in a sequence of a non-elastomeric first stage, an elastomeric second stage and a non-elastomeric third stage. Preferably the first stage polymer has a glass transition temperature ($T_g$) greater than about 25° C., preferably greater than about 60° C., and is a polymer comprising (a) 70 to 100%, preferably 85 to 99.9%, monomer units of one or more of ($C_1$-$C_4$)alkyl (meth)acrylates (preferably MMA and EA), styrene, substituted styrene, acrylonitrile and methacrylonitrile, based on weight of the first stage polymer; (b) zero to 10%, preferably 0.05 to 5% and more preferably 0.5 to 2%, monomer units of a copolymerizable polyfunctional crosslinking monomer; (c) zero to 10%, preferably 0.05 to 5%, monomer units of a copolymerizable graftlinking monomer, such as the allyl, methallyl and crotyl esters of monoethylenically unsaturated monocarboxylic and dicarboxylic acids, for example allyl methacrylate; and (d) zero to 30%, preferaby 0.1 to 15%, of other copolymerizable monoethylenically unsaturated monomers.

The second stage polymer is prepared in the presence of the first stage polymer and preferably has a $T_g$ of less than about 25° C., preferably less than about 10° C., if it were to be prepared alone, that is in the absence of the presence of the first stage polymer. Typically the second stage polymer comprises (a) 50 to 99.9%, preferably 70 to 99.5%, monomer units of one or more of ($C_1$-$C_8$)alkyl (meth)acrylates, (preferably ($C_1$-$C_4$)alkyl acrylates, particularly BA), butadiene and substituted butadienes (such as isoprene, chloroprene and 2,3-dimethylbutadiene), based on weight of the second stage polymer; (b) zero to 49.9%, preferbly 0.5 to 30%, monomer units of a copolymerizable monoethylenically unsaturated monomer, such as styrene and substituted styrene; (c) zero to 5% monomer units of a copolymerizable polyfunctional crosslinking monomer, such as ethylene glycol diacrylate and divinylbenzene; and (d) 0.05 to 5% monomer units of a copolymerizable graftlinking monomer, such as those described above.

The third stage polymer is prepared in the presence of the product of the first and second stage polymers and preferably has a $T_g$ greater than about 25° C., preferably greater than about 50° C., if it were to be prepared alone, that is in the absence of the presence of the product of the first and second stage polymers. Typically the third stage polymer comprises (a) 70 to 100%, preferably 85 to 99.9%, monomer units of one or more of ($C_1$-$C_4$)alkyl (meth)acrylates, styrene, substituted styrene, acrylonitrile and methacrylonitrile, based on weight of the second stage polymer; (b) zero to 30, preferably 0.1 to 15%, monomer units of a copolymerizable monoethylenically unsaturated monomer; (c) zero to 10%, preferably 0.05 to 5%, monomer units of a copolymerizable polyfunctional crosslinking monomer; and (d) zero to 5% monomer units of a copolymerizable graftlinking monomer, such as those described above.

Typically the multi-stage polymer comprises at least three stages in a sequence of 10 to 40%, preferably 20 to 40%, of the first stage; 20 to 60%, preferably 30 to 50%, of the second stage; and 10 to 70%, preferably 20 to 50%, of the third stage, based on total weight of the multi-stage polymer.

Other copolymerizable mononethylenically unsaturated monomers referred to above include alkyl (meth)acrylates, alkoxy (meth)acrylates, hydroxyalkyl (meth)acrylates, cyanoethyl (meth)acrylates, (meth)acrylamides, (meth)acrylic acids and vinylaromatics, for example.

Typical copolymerizable polyfunctional crosslinking monomers include, for example, ethylene glycol dimethacrylate and diacrylate, 1,3-butylene glycol dimethacrylate and diacrylate, 1,4-butylene glycol dimethacrylate and diacrylate, propylene glycol dimethacrylate, divinylbenzene, trimethylolpropane triacrylate, trimethylolpropane trimethacrylate and diethyleneglycol divinyl ether. Preferred crosslinkers are ethylene glycol dimethacrylate and divinylbenzene. For the purpose of the preparing the multi-stage sequentially-produced polymers, the crosslinkers are selected from polyfunctional monomers where the crosslinking groups have similar reactivities, such as those just described. Polyfunctional "crosslinking" monomers where the functional groups have different reactivities, such as allyl methacrylate and methallyl and crotyl esters of monoethylenically unsaturated monocarboxylic and dicarboxylic acids, are referred to as "graftlinking" monomers when used in preparation of the multi-stage sequentially-produced polymers described herein; however they are considered to be among the general group of "crosslinking" monomers useful in the preparation of other crosslinked polymers, such as those used to provide the particulate crosslinked polymers of the present invention.

Preferably, the multi-stage polymer is an emulsion polymer comprising monomer units of methyl methacrylate in the first stage, monomer units selected from one or more of butadiene, styrene and ($C_1$-$C_8$)alkyl acrylates in the second stage, and monomer units selected from one or more of ($C_1$-$C_4$)alkyl methacrylates, styrene and acrylonitrile in the third stage.

The multi-stage polymers may be prepared by a number of well-known techniques, for example, by emulsion polymerization, where a subsequent stage monomer mixture is polymerized in the presence of a previously formed product. For example, "sequentially produced" or "sequentially polymerized" refer to polymers prepared in aqueous dispersion or emulsion form where successive monomer charges are polymerized onto or in the presence of a preformed latex prepared by the polymerization of a prior monomer charge and stage.

The blend of the multi-stage polymer (as an impact modifier) with the thermoplastic polymer can be accomplished by any known method, such as dispersing the multi-stage polymer in a monomer mixture used to prepare the thermoplastic polymer or in a monomer-polymer syrup mixture which together would provide the desired thermoplastic polymer. Alternatively, the multi-stage polymer can placed in a casting mix in the form of an emulsion, suspension or dispersion in water or in an organic carrier; the water or organic carrier can then be removed before or after casting into the final thermoplastic polymer form. The multi-stage polymer may also be blended with the thermoplastic polymer by extrusion compounding. Additional specific methods and details of blending the thermoplastic polymer and impact modifiers are disclosed in U.S. Pat. No. 3,793,402.

A preferred thermoplastic matrix material is impact modified poly(methyl methacrylate) commercially available as Plexiglas DR101, MI-5 and MI-7 molding powder. Plexiglas (North and South America, Oroglas in Europe and Asia) is a trademark of Rohm and Haas Company, Philadelphia, Pa., USA.

In one embodiment of the present invention, the composite plastic compositions of the present invention are prepared by compounding or blending the crosslinked polymer with the thermoplastic material by dispersing particles of crosslinked polymer within a matrix of thermoplastic material using a suitable heat processing treatment. Suitable heat processing treatments include, for example, extrusion blending, hot-melt kneading and hot-melt batch mixing. For example, the crosslinked polymer particles may be melt processed by hot melt extrusion blending or compounding with thermoplastic particles and the resultant composite plastic composition is recovered in particulate form, such as pellets. Hot-melt batch mixing may include dispersion of the crosslinked particles into a melt of the thermoplastic matrix in a conventional batch mode, such as a stirred kettle; alternatively, the thermoplastic may be heated and mixed with a carrier solvent, such as toluene, and then batch mixed with the crosslinked particles, followed by flash evaporation of the solvent; the resultant composite plastic composition can then be granulated by conventional means. The resultant pellets are typically translucent to clear granules containing distinct "speckle-like" particles, the latter being representative of the crosslinked polymer used in the compounding process.

Typically 10 to 45%, preferably 15 to 40% and more preferably greater than 20 to 40%, crosslinked polymer particles are combined with 55 to 90%, preferably from 60 to 85% and more preferably from 60 to less than 80%, thermoplastic particles, based on combined weight of crosslinked polymer and thermoplastic particles. The extrusion blending process allows for a relatively uniform distribution of the thermoset material throughout the thermoplastic matrix without requiring similar densities of the two materials, as is typically required in conventional casting processes used in the prior art. Preferably a low-shear screw design is used to minimize processing problems, such as residual monomer odor, vent plugging, flowability problems and stranding problems.

Extrusion temperatures are typically in the range of 220° to 260° C. and the extruder screw design should provide low shear to prevent the loss of the distinct granite-like appearance and to maintain particle integrity. The cooling bath temperature (strand takeup) is typically maintained at about 60° to 70° C. and the vent section of the extruder may be vacuumed to minimize pelletization problems.

During the extrusion blending process, control of the particle size of crosslinked polymer is important for optimum processing and ultimate "granite-like" appearance of the finished articles. When the particles are very large, that is, greater than about 1.2 mm or 16 mesh, "stranding" problems may develop during sheet extrusion or extrusion blending processes. When the particles are much smaller than about 0.2 mm or 70 mesh, the extruder die may plug frequently and stranding problems may develop; in addition, poor "granite-like" appearance occurs.

If the crosslinking level is too low, that is, below about 0.5%, the crosslinked polymer particles may "smear" into thermoplastic matrix material after multiple passes during extrusion, resulting in blurred or non-differentiated mineral-like appearance. If the crosslinking level is too high, that is, above about 10%, the yield of desired particle size during the comminution step is reduced due to generation of fine particles smaller than about 0.2 mm (70 mesh) and the sheet surfaces of the final article may be rough and require a secondary treatment such as press polishing. Preferably, the crosslinker level is from 0.5 to 5% and more preferably from 1 to 4%.

An example of the importance of the degree of crosslinking in the particulate material regarding the maintenance of particle integrity during processing can be seen in the multiple extrusion processes typically involved in preparing monolithic and multilayed composite sheets. When prior art particles ("C" particles from Safas Corp., mixture of thermoplastic and thermoset material—see Example 3E-3G) were extrusion blended with thermoplastic matrix material at a low concentration (less than 10%), the final sheet provided a hazy speckle-like appearance (not "granite-ike"). At a 25% use rate, about half of the "C" particles were smeared into thermoplastic matrix resulting in a non-differentiated final product appearance. When the use rate of "C" particles was above 30%, extrusion process problems were observed (power surges, poor flow, stranding problem, extruder pluggage) as well as complete loss of granite-like effect in the composite plastic material. Composite plastic compositions prepared using the "C" particles discussed above (thermoset/thermoplastic particles disclosed in U.S. Pat. No. 5,304,592) undergo loss of granite-like appearance under the extrusion processing conditions described in Example 3, apparently due to insufficient particle integrity.

Simulated mineral articles are prepared from the composite plastic compositions of the present invention by heat treatment into a physical form selected from the group consisting of sheet, laminated sheet and molded material. Suitable heat treament processes include, for example, melt extrusion, coextrusion, blow molding, sheet forming and thermoforming.

The composite plastic compositions of the present invention can be extruded into monolithic sheet for indoor or outdoor applications, or coextruded with other high-impact grade thermoplastics such as ABS terpolymer, ASA copolymer, polycarbonate, MBS copolymer, HIPS, acrylonitrile/acrylate copolymer, acrylonitrile/methyl methacrylate copolymer, impact modified polyolefins and impact modified PVC, to produce a multilayer composite sheet useful for spa, sanitary ware, countertops, bathroom and kitchen fixtures, wall decorations and other thermoforming applications. The composite plastic compositions may also be injection molded into different forms for other applications such as facets, frames, door handles, window frames, sinks, shower stalls, building panels, plumbing fixtures, tiles, refrigerator walls, floor coverings and decorative moldings.

Some embodiments of the invention are described in detail in the following Examples. All ratios, parts and percentages are expressed by weight unless otherwise specified, and all reagents used are of good commercial quality unless otherwise specified. Abbreviations used in the Examples and Tables are listed below with the corresponding descriptions.

| | |
|---|---|
| MMA = | Methyl Methacrylate |
| EA = | Ethyl Acrylate |
| AA = | Acrylic Acid |
| ALMA = | Allyl Methacrylate |
| AIBN = | Azodiisobutyronitrile |
| TBP = | tert-Butyl Peroctoate |
| TBPV = | tert-Butyl Peroxypivalate |
| $TiO_2$ = | Titanium Dioxide |

EXAMPLE 1

Preparation of Crosslinked Polymer

A monomer mixture was prepared by combining crosslinker monomer (ALMA), alkyl (meth)acrylate monomer (MMA), (meth)acrylic comonomer (EA, AA), inert filler ($TiO_2$, silica, carbon black), free-radical initiator (AIBN, TBP, TBPV mixture, 0.05%) polymerization rate-moderator (terpinolene, 0.01%) and lubricant (2% stearic acid). All % values are by weight based on total weight of monomers.

The ingredients listed above (monomer mixture) were mixed in a glass casting cell or polyvinyl alcohol (PVA) casting bag and then subjected to a controlled temperature of 60° C. for 14 hours, followed by a post-cure (heating at 130° C. for 2 hours). The finished crosslinked polymer was recovered by disassembly of the cell or removal of the PVA bag and was then granulated into particulate form using any conventional grinding method, for example, crushing, attrition mill or Cumberland cutter. The granulated crosslinked polymer was then screened to a desired particle size distribution.

Table I summarizes crosslinked polymers (component % based on weight of crosslinked polymer, monomers plus crosslinker) evaluated in the composite plastic compositions of the present invention. Crosslinked polymers typically contained less than 1% residual monomer and were screened after comminution to particulate form, with a typical isolated yield of 65 to 80% particles of −18+40 U.S. standard mesh (0.4 mm to 1 mm).

TABLE I

Compositions of Crosslinked Polymers

| ID | Monomers[a] | Crosslinker[b] | Inert Filler[c] |
|---|---|---|---|
| 1A | 94.5/3.1/2.1 | 0.3 | 3 |
| 1B | 93.0/3.0/2.0 | 2.0 | 3 |
| 1C | 93.0/3.1/0.0 | 3.9 | 3 |
| 1D | 95.0/3.1/0.0 | 1.9 | 2/2[d] |
| 1E[e] | 96/4/0 | 0.0 | 2.6 |

[a] = MMA/EA/AA
[b] = ALMA
[c] = Titanium Dioxide
[d] = Silica/Carbon Black
[e] = Uncrosslinked, weight average molecular weight approx $3 \times 10^6$

EXAMPLE 2

Preparation of Thermoplastic Matrix Material

The thermoplastic matrix material used in evaluating the composite plastic compositions of the present invention was impact modified poly(methyl methacrylate) commercially available as Plexiglas DR101 molding powder from Rohm and Haas Co, Philadelpia, Pa., USA.

EXAMPLE 3

Preparation of Composite Plastic Composition

The particulate crosslinked polymer (0.4 to 1 mm granules) of Example 1 were extrusion blended (using a single- or twin-screw extruder at 220 to 260° C.) with the thermoplastic material (pellets of approximately 3 to 6 mm in diameter and length) of Example 2 (in the relative amounts indicated) into the composite plastic composition of the present invention (see Table 2). The pelletized composite plastic compositions were then sheet extruded and evaluated for their aesthetic and processing characteristics. Examples 3A-3D represent the present invention and 3E-3G represent comparative examples that replace the particulate crosslinked polymer of the present invention with thermoplastic/thermoset particles based on U.S. Pat. No. 5,304,592 (provided by Safas Corp.).

TABLE 2

| ID | Crosslinked Polymer | Thermoplastic Material | Sheet Extrusion | Sheet Appearance |
|---|---|---|---|---|
| 3A | Ex 1A (35%) | Ex 2 (65%) | Crosslinked particles melted into matrix | No granite texture |
| 3B | Ex 1B (35%) | Ex 2 (65%) | Good processing | Granite texture and smooth surface |
| 3C | Ex 1C (35%) | Ex 2 (65%) | Poor process, stranding and pelletizing problems | Rough surface |
| 3D | Ex 1D (37%) | Ex 2 (63%) | Good processing | Granite texture and smooth surface |
| 3E** | "C" Particles[a] (7-8%) | Ex 2 (92-93%) | No processing problems | Speckled texture with haziness* |
| 3F** | "C" Particles[a] (25%) | Ex 2 (75%) | Majority of particles melted into matrix | Poor granite texture and poor particle/matrix differentiation* |

TABLE 2-continued

| ID | Crosslinked Polymer | Thermoplastic Material | Sheet Extrusion | Sheet Appearance |
|---|---|---|---|---|
| 3G** | "C" Particles$^a$ (32%) | Ex 2 (68%) | Poor process, stranding and pelletizing problems | No granite texture, opaque* |
| 3H | Ex 1B/1D (<10%) | Ex 2 (>90%) | Good processing | Transparent, little or no granite texture |
| 3J | Ex 1B/1D (>45%) | Ex 2 (<55%) | Poor process, stranding and pelletizing problems | Rough surface |
| 3K | Ex 1E (25-35%) | Ex 2 (65-75%) | Good processing | No granite texture |

*= appearance from Carver press "button"
**= comparative composite plastic composition, not of the present invention
$^a$= thermoplastic/thermoset particles from Safas Corp., −25 + 35 ANN

EXAMPLE 4

Physical Properties of Composite Plastic Compositions

Composite plastic compositions based on different crosslinked polymers (prepared according to Example 1) and the thermoplastic matrix material of Example 2 were fabricated into test samples of sheet (injection molding and sheet extrusion) or film (Carver press) and evaluated for overall appearance and impact strength.

The Falling Dart [dart: 1.36 kilogram (3-pound), 0.63 centimeter, cm (0.25 inch, m) radius; sample of 15.2 cm (6 in)×15.2 cm (6 in)×0.32 cm (0.125 in)] and Notched Izod (23° C., 73° F.) tests were conducted according to ASTM method D256 (published by the American Society for Testing and Materials) as measures of impact strength.

TABLE 3

| Composite Plastic Composition | Falling Dart Impact Test Total energy, joules (foot-pounds) | Notched Izod joule/centimeter (foot-pound/inch) |
|---|---|---|
| Ex 1B/1D (15%)/Ex 2 (85%) | 10.4 (7.7) | 0.42 (0.79) |
| Ex 1B/1D (30-37%)/Ex 2 (63-70%) | 3.9 (2.9) | 0.29-0.30 (0.54-0.56) |

In addition to the sheet extrusion process used to evaluate the "granite-like" effect, the appearance of the compounded composite material was also visually examined using a "button" prepared on a Carver press according to the following conditions: 65 grams of composite plastic composition pellets were placed in an "X" configuration in a 12.7 cm×12.7 cm×0.25 cm thick (5 in×5 in×0.1 in thick) aluminum mold between chrome-plated plates; the press was subjected to 1 minute preheat at 188° C. (370° F.) under 3.45×10$^6$ pascals (Pa) presssure (500 pounds per square inch/psig), 1 minute heat at 188° C. (370° F.) under 8.27×10$^7$ Pa (12,000 psig) and 1 minute cool at 10° C. (50° F.) under 8.27×10$^7$ Pa (12,000 psig). The appearances of the Carver press "buttons" for composite plastic compositions of the present invention and that of the prior art were consistent with those described in Table 3 for Examples 3D and 3G, respectively.

We claim:

1. A particulate composite plastics composition comprising a blend of separately formed polymer particles of different compositions, comprising;
   a) 55 to 90 weight percent of at least one thermoplastic polymer in the form of particles as the matrix polymer; wherein said thermoplastic polymer is reversibly deformable, wherein the thermoplastic matrix polymer is selected from the group consisting of alkyl (meth) acrylate polymers and copolymers, aerylonitrile-butadiene-styrene (ABS) terpolymers, acrylonitrile-styrene-acrylic (ASA) copolymers, polycarbonates, polyesters, poly(butylene terephthalate), poly(ethylene terephthalate), MBS copolymers, high impact polystyrene (HIPS), acrylonitrile/acrylate copolymers, acrylonitrile/methyl methacrylate copolymers, impact modified polyolefins and impact modified polyvinyl chloride (PVC), or mixtures thereof,
   b) 10 to 45 weight percent of at least one crosslinked polymer composition in the form of particles having a particle size of from 0.2 to 1.2 millimeters; comprising 0.1 to 15 weight percent inert filler and 0.1 to 20 weight percent crosslinker, based on the total weight of crosslinked polymer;
   wherein said crosslinked polymer is visually differentiable from the thermoplastic matrix,
   wherein said crosslinked polymer particles are allyl ester polymer, epoxy resin, or crosslinked polymer formed from a monomer mixture comprising vinylaromatic monomers, (meth)acrylic monomers, or a mixture thereof;
   wherein said particulate composite plastics composition is capable of multiple passes through extrusion or injection molding; and
   wherein said particulate composite plastics composition is in the form of pellets, beads, powder, granules or chips.

2. The composite plastics composition of claim 1 wherein said thermoplastic matrix comprises from zero to 75 percent impact modifier, based on the weight of thermoplastic matrix.

3. The composite plastics composition according to claim 2 wherein the impact modifier is a multi-stage sequentially-produced polymer containing an elastomeric stage.

4. The composite plastics composition according to claim 1 wherein said crosslinker is selected from the group consisting of allyl methacrylates, ethylene glycol dimethacrylate, divinylbenzene, and mixtures thereof.

5. The composite plastics composition according to claim 1 further comprising an inert filler selected from one or more of titanium dioxide, iron oxide, alumina, pigments, carbon black and silica.

6. The composite plastics composition according to claim 1 wherein the particle size of the crosslinked polymer is substantially from 0.3 to 1.2 millimeters.

7. An article comprising the composition of claim 1 wherein said article is formed from said composition by extrusion or molding.

8. The article of claim 7, selected from the group consisting of a spa, sanitary ware, countertops, bathroom and kitchen fixtures, wall decorations, faucets, frames, door handles, window frames, sinks, shower stalls, building panels, plumbing fixtures, tiles, refrigerator walls, floor coverings, and decorative moldings.

* * * * *